US006557457B1

(12) United States Patent
Hart et al.

(10) Patent No.: US 6,557,457 B1
(45) Date of Patent: May 6, 2003

(54) BUSHINGLESS PISTON AND CONNECTING ROD ASSEMBLY AND METHOD OF MANUFACTURE

(75) Inventors: Kevin Hart, Orangeburg, SC (US); Miguel Azevedo, Ann Arbor, MI (US); Jose Rebello, Ann Arbor, MI (US); Carmo Ribeiro, Ann Arbor, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 171 days.

(21) Appl. No.: 09/688,677

(22) Filed: Oct. 16, 2000

Related U.S. Application Data
(60) Provisional application No. 60/168,352, filed on Dec. 1, 1999.

(51) Int. Cl.$^7$ .................................................. F16J 1/04
(52) U.S. Cl. ......................................................... 92/223
(58) Field of Search ................... 92/187, 223; 384/625, 384/907, 913

(56) References Cited

U.S. PATENT DOCUMENTS

| 448,766 | A | 3/1891 | Trione |
| 491,974 | A | 9/1893 | Stevens |
| 2,202,773 | A | 5/1940 | Given |
| 3,935,797 | A | 2/1976 | Niimi et al. |
| 4,430,906 | A | 2/1984 | Holtzberg et al. |
| 4,974,498 | A | 12/1990 | Lemelson |
| 5,255,592 | A | * 10/1993 | Lewis, Jr. ................ 92/223 |
| 5,257,603 | A | 11/1993 | Bauer et al. |
| 5,352,541 | A | * 10/1994 | Tanaka et al. ............. 428/628 |
| 5,836,280 | A | * 11/1998 | Miyazawa ................ 92/223 |

FOREIGN PATENT DOCUMENTS

DE 4111368 A1 * 1/1992

* cited by examiner

Primary Examiner—F. Daniel Lopez
Assistant Examiner—Thomas E. Lazo
(74) Attorney, Agent, or Firm—Reising, Ethington, Barnes, Kisselle, Learman & McCulloch, P.C.

(57) ABSTRACT

A piston assembly for heavy duty diesel engine applications comprises a piston having pin bosses formed with pin bores for the accommodations of a wrist pin. The wrist pin is fabricated of steel and is extendable through the small end bore of a steel connecting rod and the bores of the piston body for coupling the piston body to the connecting rod. In lieu of a conventional Cu—Pb—Sn bushing usually pressed into the small end bore, a coating of manganese phosphate is applied to either the pin or small end bore of the connecting rod and pin bosses to provide the necessary tribological properties therebetween. The porous coating absorbs and entraps lubricating oil, creating a still lubricant squeeze film between the steel running surfaces under heavy load.

23 Claims, 2 Drawing Sheets

BUSHINGLESS PISTON AND CONNECTING ROD ASSEMBLY AND METHOD OF MANUFACTURE

This application claims the benefit of U.S. Provisional application Ser. No. 60/168,352 filed Dec. 1, 1999.

BACKGROUND OF THE INVENTION

The disclosure incorporates the bushingless piston and connecting rod assembly and method of manufacture disclosed in provisional application 60/168,352, filed Dec. 1, 1999, whose priority is claimed for this application.

1. Technical Field

This invention relates generally to pistons for heavy duty diesel engine applications.

2. Related Prior Art

The small end of steel connecting rods for heavy duty diesel applications typically has a Cu—Pb—Sn bushing pressed therein in order to provide tribological compatibility between the steel connecting rod and a steel wrist pin installed in the small end for coupling the connecting rod to an associated piston. Diesel engines are known to generate a corrosive, abrasive operating environment around such bushings. As emission regulations become more stringent to reduce Nox generation in the cylinders, it is expected that the levels of corrosive environmental constituents such as sulfur, nitrous and weak organic acids condensation will increase within the cylinder on the order of about 20 to 30% and attack such Cu-based bushings. In addition, ashes resulting from the wear of liners and rings and the lubricant combustion will likely be ingested with the air stream, such that the environment around the bushing will become much more corrosive to standard Cu—Pb—Sn bushings than the environments they presently operate under. Moreover, the ever increasing demand for greater performance of engines is expected to increase combustion pressures to 180 bar and beyond, exceeding the load capacity of the traditional Cu—Pb—Sn bushings. Similar concerns arise with respect to the Cu-based bushings traditionally used between the wrist pin and the body of the piston.

It is an object of the present invention to overcome such problems by eliminating the need for such bushings through the use of engineered coatings.

SUMMARY OF THE INVENTION

A piston assembly for an internal combustion engine includes a piston body formed with a cross bore, a steel connecting rod having a cross bore with a steel running surface aligned with the cross bore of the piston body, and a steel wrist pin disposed in the aligned bores and coupling the piston body and the connecting rod and having a steel running surface. According to the invention, a coating of manganese phosphate is applied to at least one of said steel running surfaces of the wrist pin and the connecting.

The coating absorbs and traps lubricating oil and develops a stiff lubricant squeeze film between the mating running surfaces of the connecting rod and wrist pin to provide the necessary tribological properties, eliminating the need for a conventional Cu-based bushing.

The invention has the further advantage of overcoming the concerns of the more aggressive operating environment, since the parent steel materials and the thin coating are inherently resistant to such constituents and retain their properties at elevated temperatures.

The invention has the further advantage of minimizing or eliminating the concern over bushing wear from increased levels of abrasive contaminants. The steel pins and connecting rods along with the coating are resistant to wear from such contaminants.

By eliminating the bushing, a cost savings is also recognized in both the material and labor of installation along with a reduction in the weight of the piston assembly.

According to a further aspect of the invention, the same coating principle is used between the wrist pin and cross bore surface in the piston body to eliminate the need for the normal bushings. The same advantages apply.

BRIEF DESCRIPTION OF THE DRAWINGS

These and other features and advantages of the invention will be more readily appreciated in connection with the following detailed description and drawings, wherein.

DETAILED DESCRIPTION

Figure 1:
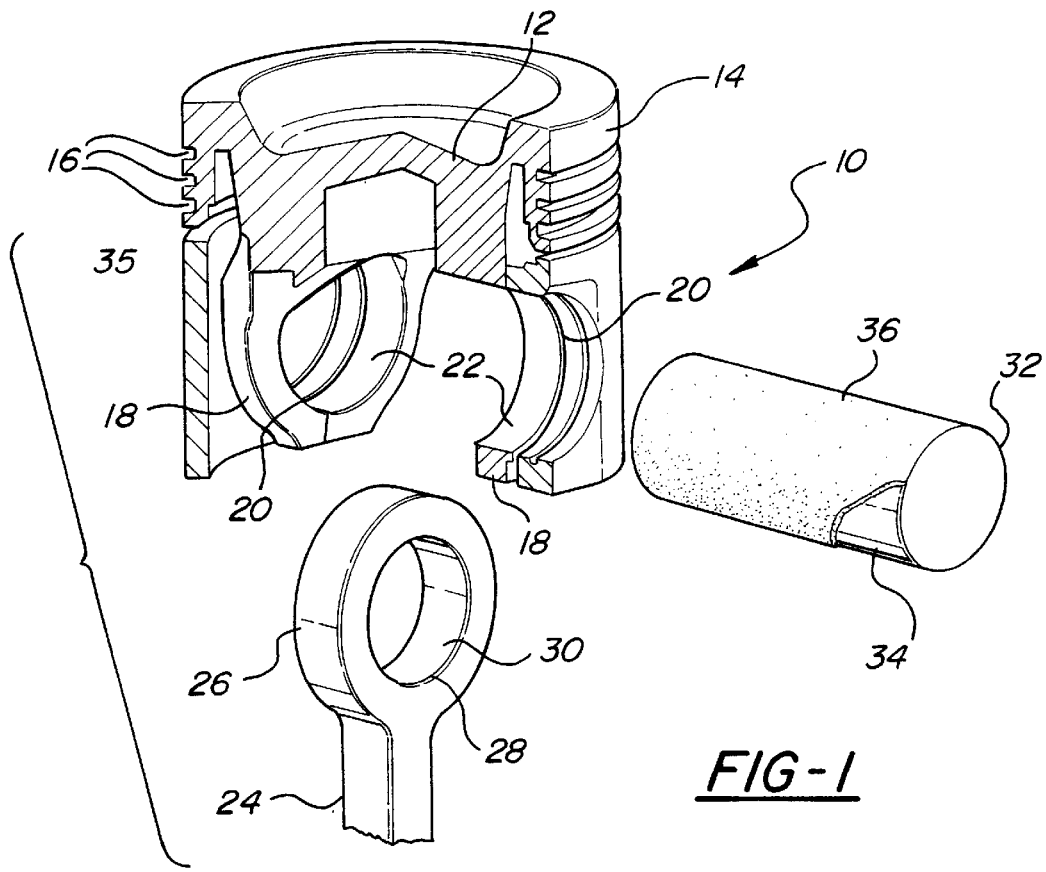
FIG. 1 is an exploded perspective view of a piston assembly constructed according to the invention.
Figure 2:
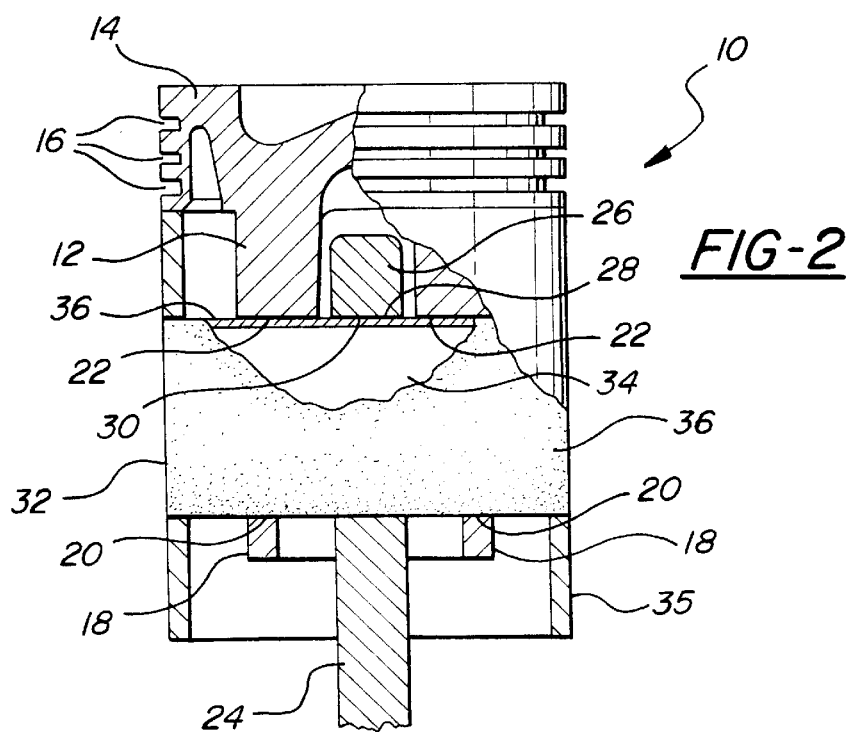
FIG. 2 is an enlarged fragmentary sectional view of the assembled components of FIG. 1.

A piston assembly constructed according to a first embodiment of the invention is shown generally at 10 in FIGS. 1 and 2 and comprises a steel piston body 12 (cast or forged) having an upper crown portion 14 formed with ring grooves 16 for the accommodation of rings (not shown) from which depending pin boss formations 18 external and are formed with a cross bore 20 having a ground running surface 22 fabricated of steel.

A steel connecting rod 24 (cast or forged) has a small end 26 formed with a cross bore 28 having a ground steel running surface 30 alignable with the cross bore 20 of the piston body 12 as shown in FIG. 2.

A steel wrist pin 32 has an outer steel running surface 34 dimensioned for installation within the aligned bores 20,28 of the piston body 12 and connecting rod 24.

A skirt 35 is provided and may be formed separately from the piston body 12 from a lightweight material such as aluminum and joined by the wrist pin 32 as shown to provide an articulated structure, or formed of one piece with the piston body of the same material in a monobloc construction (not shown).

According to the invention, at least one of the steel running surfaces 34 of the wrist pin 32 and 30 of connecting rod 24 is provided with a coating 36 in lieu of the traditional Cu—Pb—Sn bushing. Likewise, the running surface 22 of the piston body 12 and/or the surface 34 of the wrist pin 32 may be provided with such a coating 36. The coating 36 is applied prior to assembly and is engineered to provide the necessary tribological properties for proper operation of the assembly without the usual bushing. The coating 36 preferably comprises a manganese phosphate, $MnP(OH)_2$, coating applied to either the running surface of the wrist pin 32 or the connecting rod 24. In the embodiment shown in FIGS. 1 and 2, the coating 36 is applied to the wrist pin 36, and the surfaces 22 and 30 are without coating.

By eliminating the presence of the usual bushing through provision of the coating 36, concerns for mechanical, chemical and temperature limitations associated with the usual bushings are also eliminated. The strength of the parent materials (steel-on-steel through the thin coating) is brought to bear the mechanical loads. Steels used for wrist pins 32 and connecting rods 24 are inherently resistant to the corrosive environment of the cylinder in which the assembly operates and maintain their properties at elevated temperatures. The steel parent materials and coating are also far more tolerant of abrasives in the environment than that of the usual bushings.

The manganese phosphate coating 36 is preferably applied at an application weight of about 2.15±1.08 mg/cm², and a grain size in the range of about 30±15 μm. The coating 36 further has a preferred surface roughness in the range of about Ra 2.0 to 3.0 μm, an $R_t$ in the range of about 11.0 to 26 μm, and a depth or thickness of about 8.0 to 15.0 μm.

Such a coating 36 is fairly open and porous and has a coarse crystalline structure which absorbs and traps lubricating oil in such manner as to develop a stiff lubricant squeeze film between the steel running surfaces of the connecting rod 24 and wrist pin 32 under heavy load. As the running surfaces try to contact one another under heavy load, the crystal lattice of the coating 36 acts a labyrinth, impeding the flow of oil through the coating 36 and building the desirable squeeze film barrier. Under boundary lubrication conditions (i.e., under low loads without the squeeze film present), the coating itself acts as a solid lubricant to provide the needed tribological properties.

In the embodiment of FIGS. 1 and 2, the coating 36 is applied to the wrist pin 32, such that it contacts and acts between the steel running surfaces 34, of the pin 32,30 of the connecting rod 24, and 22 of the steel piston body 12. While the invention is concerned primarily with the connection between the wrist pin 32 and connection rod 24, the invention contemplates use of the same coating principle between the running surfaces 34,22 of the wrist pin 32 and piston body 12 as shown, and in the same way when steel-on-steel parent materials are involved.

Figure 3:
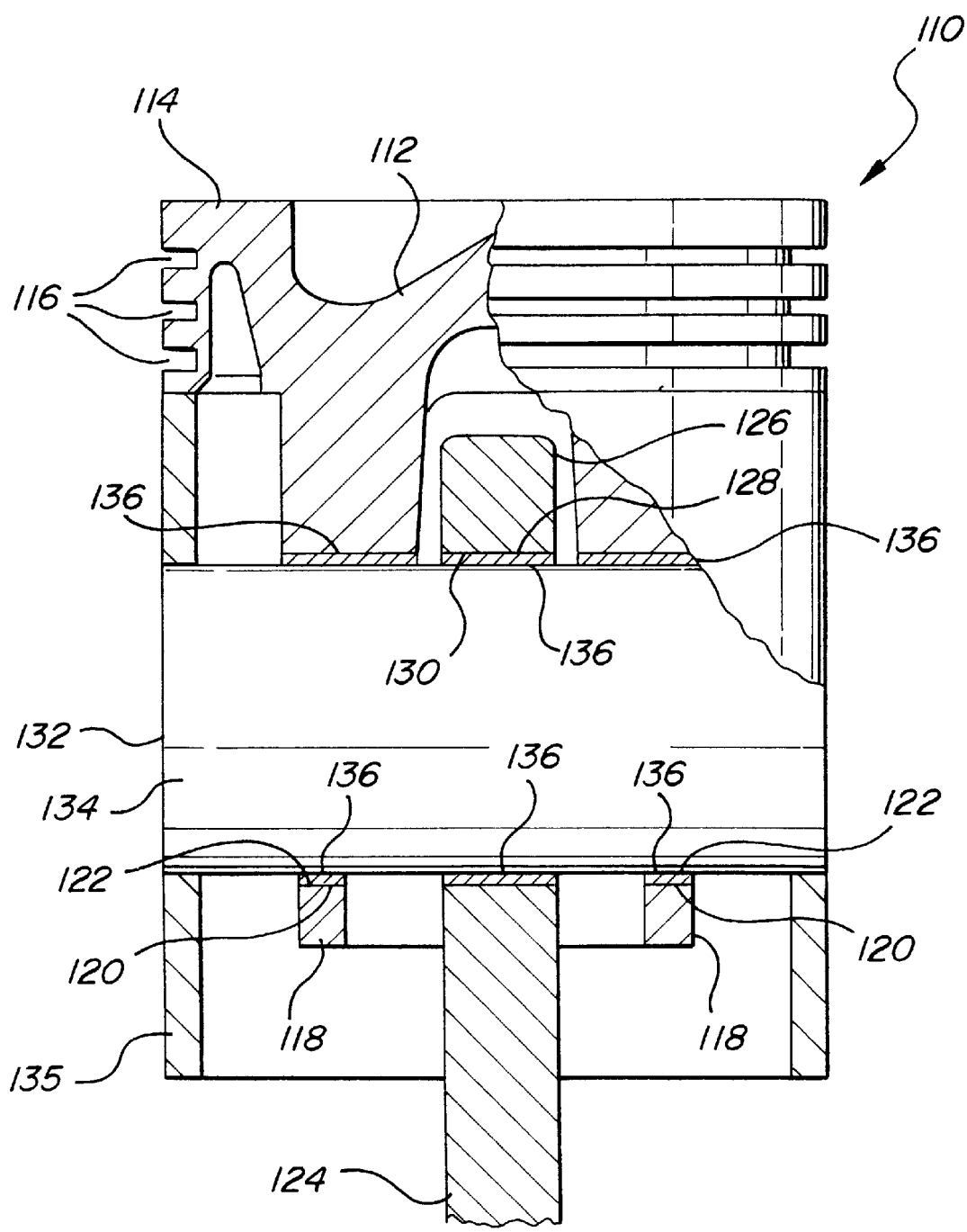
FIG. 3 is a fragmentary sectional view of an alternative embodiment of the invention.

FIG. 3 shows the alternative embodiment in which the coating 136 is applied to the steel running surface 134,122 of the connecting rod 124 and piston body 112, rather than to the running surface 134 of the wrist pin 132. The same reference numerals are used to designate like parts and features in common with the first embodiment of FIGS. 1 and 2, but are offset by 100. The second embodiment shares the same benefits and operates in the same manner, although it is believed more advantageous from a manufacturing standpoint to apply the coating to the wrist pin rather than the bore surfaces.

In connection with the connecting rod 24, other coating materials can be employed, including manganese-iron phosphates, zinc phosphates, tin-antimony phosphates, lead-based coating, and ceramics.

The disclosed embodiments are representative of presently preferred forms of the invention, but are intended to be illustrative rather than definitive thereof. The invention is defined in the claims.

What is claimed is:

1. A piston assembly for an internal combustion engine comprising:
    a piston body formed with a cross bore having a steel running surface;
    a steel connecting rod having a cross bore with a steel running surface aligned with said cross bore of said piston body;
    a steel wrist pin disposed in said aligned bores and coupling said piston body and said connecting rod, said wrist pin having a steel running surface; and
    a coating of manganese phosphate applied to at least one of said steel running surfaces of said wrist pin, said connecting rod and said piston body.

2. The assembly of claim 1 wherein said coating has an application weight of about 2.15±1.08 mg/cm².

3. The assembly of claim 2 wherein said coating has a thickness of about 8.0 to 15.0 μm.

4. The assembly of claim 1 wherein said coating has an average grain size in the range of about 30±15 μm.

5. The assembly of claim 1 wherein said coating has a surface roughness in the range of about Ra 2.0 to 3.0 μm.

6. The assembly of claim 5 wherein said coating has an $R_t$ in the range of about 11.0 to 26 μm.

7. The assembly of claim 1 wherein said coating is applied to said wrist pin.

8. The assembly of claim 7 wherein said cross bore of said piston has a steel running surface in contact with said coating on said wrist pin.

9. The assembly of claim 1 wherein said cross bore of said piston has a steel running surface and a coating of manganese phosphate applied hereto in contact with said steel running surface of said wrist pin.

10. The assembly of claim 1 wherein said coating provides the sole bearing tribological material between said steel running surface of said wrist pin and said cross bores of said connecting rod and said piston body.

11. A method of constructing a piston assembly having a piston body formed with a cross bore having a running surface, a steel connecting rod formed with a cross bore having a steel running surface, and a steel wrist pin having a steel running surface, said method comprising:
    applying a coating of manganese phosphate to the steel running surface of at least one of the wrist pin, the connecting rod and cross bore of piston:
    aligning the cross bores of the piston body and connecting rod; and
    disposing the wrist pin within the aligned bores of the piston body and connecting rod such that the coating is in contact with and acts between the steel running surfaces.

12. The method of claim 11 wherein the coating is applied at a weight of about 2.15±1.08 mg/cm².

13. The method of claim 11 wherein the coating is applied to have an average grain size in the range of about 30±15 μm.

14. The method of claim 11 wherein the coating is applied to have a surface roughness in the range of about Ra 2.0 to 3.0 μm.

15. The method of claim 14 wherein the coating has an $R_t$ in the range of about 11.0 to 26 μm.

16. The method of claim 11 wherein the coating is applied to a thickness of about 8.0 to 15.0 μm.

17. The method of claim 11 wherein the coating is applied to said wrist pin.

18. The method of claim 17 wherein the coating is applied to the wrist pin so as to be in contact with the steel running surface of the piston.

19. The method of claim 11 wherein the cross bore of the piston has a steel running surface and applying the manganese phosphate coating to the steel running surfaces of the connecting rod and piston body to be in contact with the steel running surface of the wrist pin.

20. A piston assembly for an internal combustion engine comprising:
  a metallic piston body formed with a cross bore having a cross bore surface;
  a wrist pin accommodated within said cross bore for coupling said body to an associated connecting rod, said wrist pin having a wrist pin surface; and
  a coating of manganese phosphate applied to at least one of said cross bore and wrist pin surfaces, said coating having a thickness of between about 8.0 to 15.0 μm, a surface roughness of between about 2.0 to 3.0 $R_a$, and an $R_t$ range from 11.0 to 26.0 μm.

21. The assembly of claim 20 wherein the coating has an application weight of 2.15±1.08 mg/cm$^2$.

22. The assembly of claim 20 wherein the coating has an average grain size in the range of about 30±15 μm.

23. A piston assembly for an internal combustion engine comprising:
  a piston body formed with a cross bore;
  a steel connecting rod having a cross bore with a steel running surface aligned with said cross bore of said piston body;
  a steel wrist pin disposed in said aligned bores and coupling said piston body and said connecting rod, said wrist pin having a steel running surface; and
  a coating applied to at least one of said steel running surfaces of said wrist pin and said connecting rod selected from the group consisting of manganese phosphates, manganese-iron phosphates, zinc phosphates, tin-antimony phosphates, lead-based coatings, and ceramics.

* * * * *